Oct. 14, 1969 G. M. STOUT 3,472,973

ENCODING SWITCH

Filed July 28, 1967 3 Sheets-Sheet 1

INVENTOR.
GLENN M. STOUT

BY Schroeder, Siegfried & Ryan ATTORNEYS

ENCODING SWITCH

Filed July 28, 1967

3 Sheets-Sheet 2

INVENTOR
GLENN M. STOUT

BY
Schroeder, Siegfried & Ryan
ATTORNEYS

INVENTOR.
GLENN M. STOUT
BY
Schroeder, Siegfried & Ryan
ATTORNEYS

United States Patent Office 3,472,973

Patented Oct. 14, 1969

3,472,973

ENCODING SWITCH

Glenn M. Stout, 2000 Argonne Drive, Minneapolis, Minn. 55421

Filed July 28, 1967, Ser. No. 656,926

Int. Cl. H01h 9/26

U.S. Cl. 200—5 16 Claims

ABSTRACT OF THE DISCLOSURE

This invention and disclosure relates to a multiple-contract switching apparatus particularly adapted for the use of encoding switching responses. It is shown herein as an improved binary encoding switch. The plural station input switch is disclosed as a push-button type switch for the purpose of transmitting digital-type input signals to a binary coded switching output. It utilizes a single switch contact for each binary output bit and an actuating structure for operating the switch contact of each binary output bit. The actuating structure may take varying forms, such as individual segments or a solid rod. Each structure includes a camming surface at each input position or plunger to operate the associated binary output switch for each code bit making up the binary coding corresponding to the input of the digital type. In the present disclosure, the push-button type switches have plungers with actuating pins thereon which engage cam surfaces on actuating rods to displace the actuating rods and operate the output switches. The notches or cam surfaces on the actuating rods are located to correspond with various input switch plungers so that the actuating rods will be displaced for any particular switch plunger in accord with the necessary switch function to make up the output coded switch operation.

Figure 1:
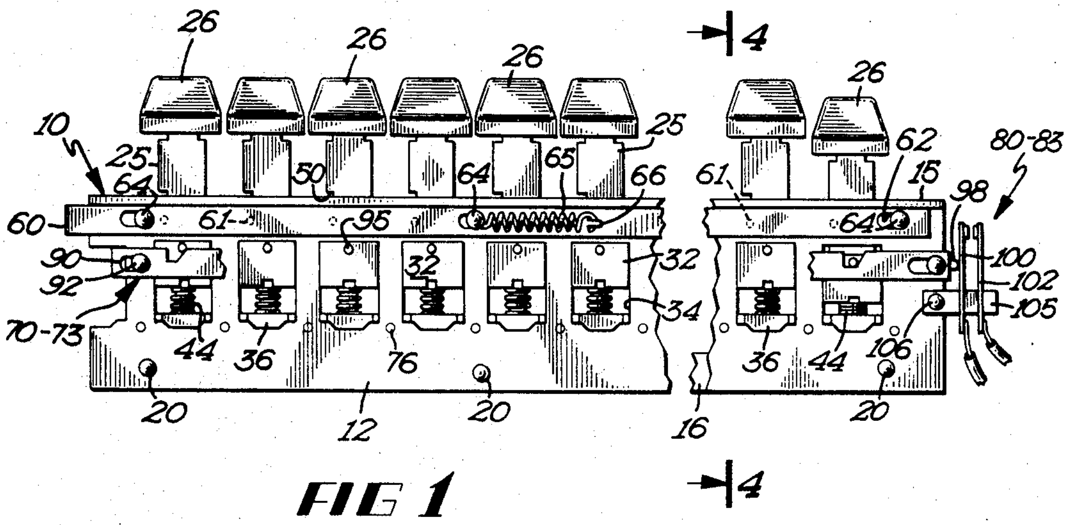

This invention relates to multiple-contact, switching apparatus and more particularly to an improved binary encoding switch.

Multiple-position and multiple-contact switches either of the rotary or ganged push-button type are known and in use in numerous applications of control and indication. Expansion in the use of computer-type equipment has greatly expanded the use of such switches. In the application of such multiple-position switches as input signalling devices or information or command-type controllers, certain limitations appear in the application of the same because of the numerous contact structures required and the complicated switch structures which result therefrom with resulting maintenance problems and installation costs. Such switches are often used as digital-type command sources where an output is to be of a coded type, such as a binary code. Historically, such switches have produced a binary output from a digital input by a combination of individual contact closures or switch structures related to each digital input position. Because of the number of switches or contact closures required, the problem of wiring, solder connections and numerous switch structures limit the use of switches in these applications.

The present invention relates to an encoding switch and system where only a single contact is used for each binary output bit. This greatly reduces the number of contact structures or closures required as well as the solder connections thereto and the amount of wire to the appropriate circuit parts. The improved encoding switch utilizes a plurality of actuating structures, sliders or bars which operate the individual output switches and which themselves are characterized with appropriate notches or cam surfaces for each input position so that selective operation of the acutator structures and appropriate switches occur in accord with the binary digit outputs required for each digital input. Thus, for example, in the present invention a multiple-position, multiple-contact switch utilizing four switches and four actuating structures, provides a binary output for fifteen individual digital inputs through the use of the four actuating structures, thereby significantly decreasing the number of switches involved and the associated installation and maintenance cost relative thereto.

Therefore, it is the principal object of this invention to provide an improved multiple-contact switching apparatus for use in encoding such as a binary encoding switch.

Another object of this invention is to provide in a binary encoding switch or multiple-position, multiple-contact switch a simplified structure which will greatly reduce the number of output contact closures or structures required.

Another object of this invention is to provide an improved binary encoding switch in which the decrease in the number of contact closures eliminates the amount of components required to manufacture the switch, reduces assembly labor and results in higher reliability because of the reduction of potential fail points in the electrical and mechanical structure.

A still further object of this invention is to provide an improved encoding switch which has a lower overall cost and requires less field maintenance and service.

Figure 2:
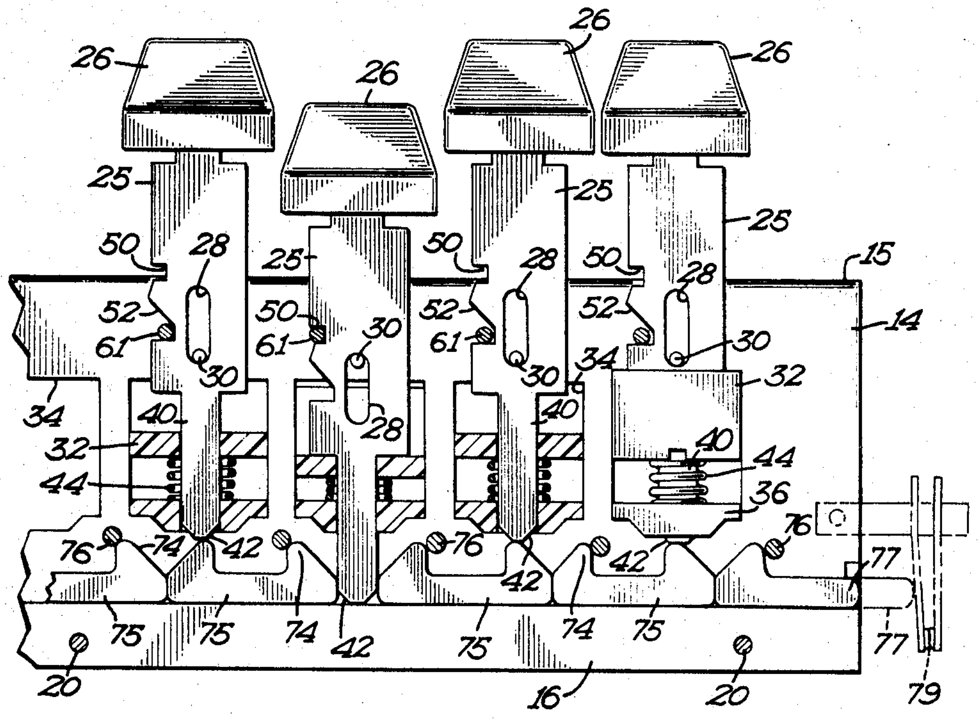
Figures 3, 4, 5, 6, 10:
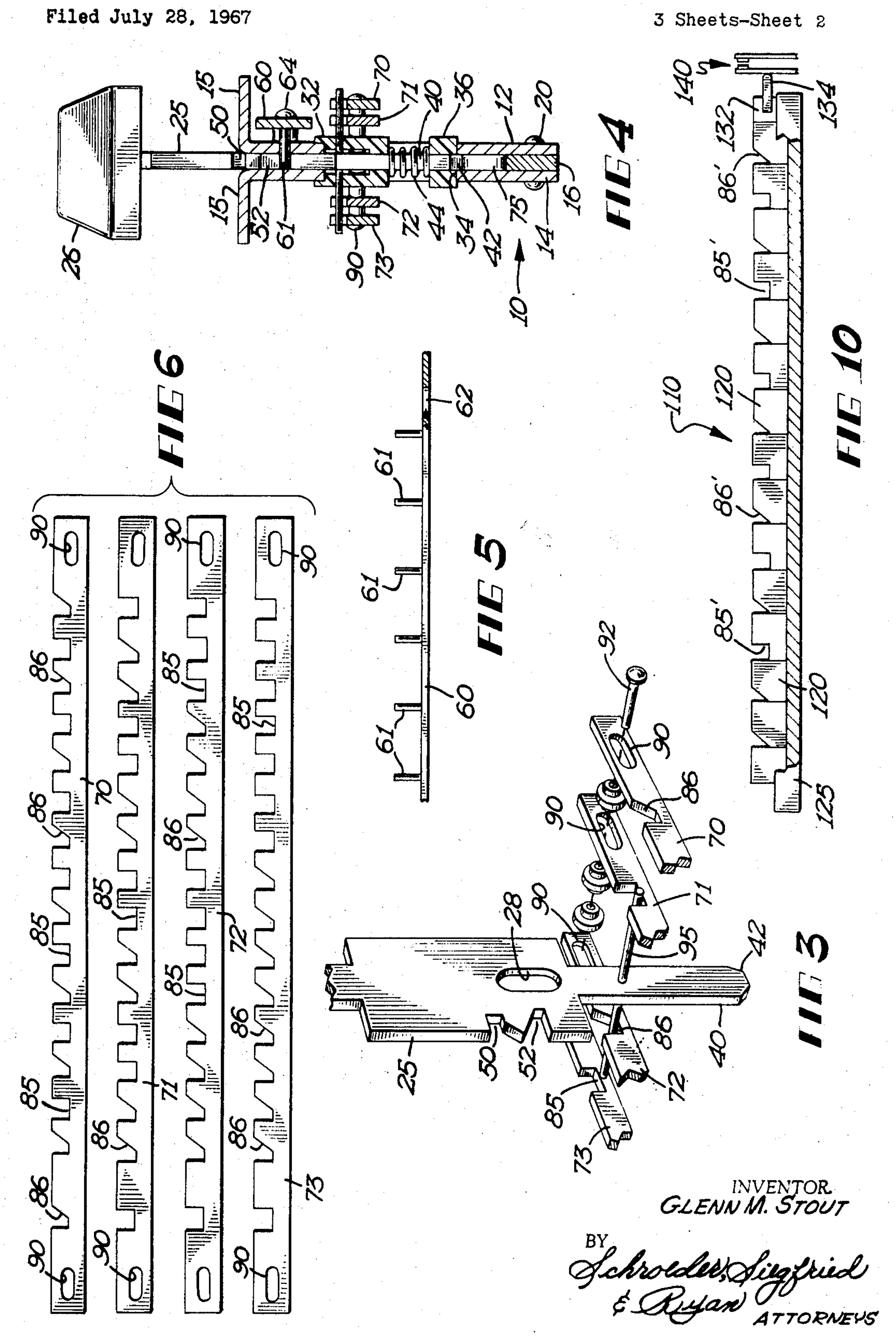
Figure 7:
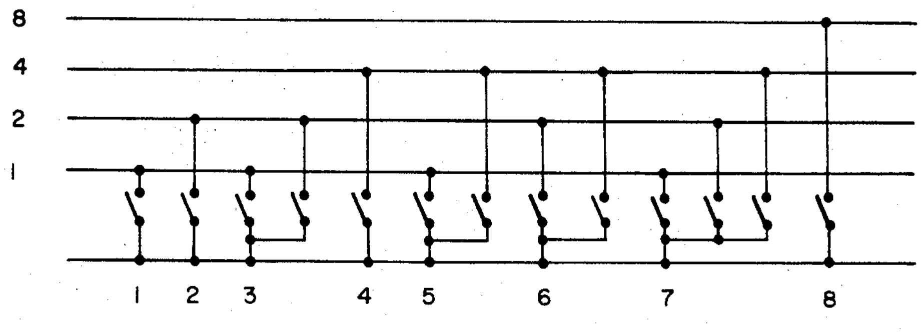
Figure 8:
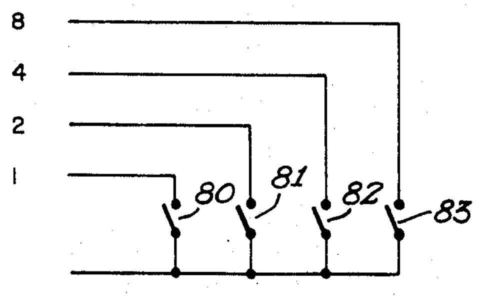
Figure 9:
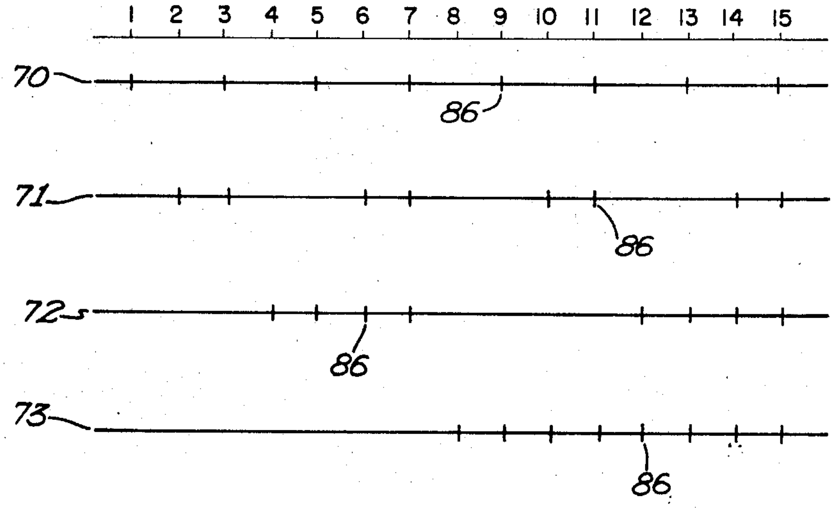

These and other objects of this invention will become apparent from the attached description together with the drawings wherein:

FIGURE 1 is a side elevation view of a binary encoding switch with parts in section, FIGURE 2 is an enlarged view of a portion of the switch in FIGURE 1 with parts broken away to disclose the relationship of parts, FIGURE 3 is a perspective view of a portion of the binary encoding switch, FIGURE 4 is a sectional view of the binary encoding switch taken along the lines 4—4 in FIGURE 1, FIGURE 5 is a plan view of a latch bar for the binary encoding switch, FIGURE 6 is an elevation view of the actuating structures of the binary encoding switch, FIGURE 7 is a schematic circuit diagram of a prior art binary encoding switch, FIGURE 8 is a schematic circuit diagram of the binary encoding switch of the present invention, FIGURE 9 is a schematic diagram showing the encoding of the actuating bars of the improved binary encoding switch, and FIGURE 10 is a schematic view of another embodiment of the actuating structures for the improved binary encoding switch.

The improved multiple-contact switching apparatus of the present invention shown herein as a binary encoding switch may be constructed in varying forms. It is shown herein as a push-button type switch and for the purpose of explanation, the switch, with parts broken away, is intended to indicate a 15 push-button switch representing 15 digital numbers from which binary code numbers will be taken through a switching function. The switch is built on a frame, indicated generally at 10, having a pair of side plates 12 and 14 with flanged extremities 15 which plates are spaced from one another by means of a spacer 16 and held together in a spaced relationship through suitable connections, such as rivets indicated at 20. The switch includes a plurality of plungers 25 each having a button 26 at one extremity of the same. The individual plungers are positioned between the spaced plates 12 and 14 and are guided for movement therebetween through a slot 28 in the plungers through which guide pins 30 extend and by means of a slidable guide block 32 positioned around each plunger and slidably mounted in window-type apertures 34 in the plates. The opposite extremity of the plunger remote from the button 26 is guided in a second guide block 36 which is held in position between the plates 12 and 14. The individual plungers have a reduced width section 40 with a pointed extremity 42 remote from the pushbutton and the reduced width section 40 extends through the guide blocks 32, 36 for guiding the plunger between the plates. A compression spring 44 encircling the reduced width section and positioned between the guide block 36, which is stationary, and the guide block 32, which is movable with the plunger, supplies a spring bias to the plunger to move it to a retracted position as determined by the pin 30 in the slot 28. The sides of the main portion of each plunger have a latching notch 50 in one side thereof and a camming notch 52 positioned below the same. These notches co-operate with pins 61 on a latch bar 60 which is mounted on one side of the spaced plates for slidable movement relative thereto with the pins projecting through apertures in the frame plates and projecting into the notches to perform the latching and unlatching function. The latch bar 60 has a plurality of elongated apertures 62 therein through which threaded pins 64 extend. Pins 64 are attached to the plates 12, 14 and are spaced intermediate the plungers to slidably mount the latch bar thereon. Suitable headed retaining means on the pins serve to mount the latch bar thereon. A spring 65 connected between a suitable tab 66 on the latch bar and one of the retaining pins 64 serve to bias the latch bar in a predetermined position. Whenever any one of the plungers 25 are deflected such that the extent of the same will be between the plates, the cam surface associated with the respective pin will engage the pin 61 causing the latch bar to slide toward a position which will allow the pin to slide out of the camming notch and into the latch notch 50 wherein the plunger 25 will be retained in a downward or latched position.

Plates 12 and 14 have additional spacer pins 76 positioned therebetween and attached to one or the other of the plates through suitable means, such as by riveting, which form stop members for lock-out slugs 75 slidably positioned on the base spacer member 16 positioned between the plates 12 and 14 at the lower extremity thereof. These lock-out slugs have raised portions 74 at the extremity of the same to give the lock-out slug a U-shaped configuration with tapered end edges. The stop pins 76 are positioned to engage the raised tips 74 of the lock-out slugs to retain the same in position and will permit sliding movement of the same on the spacer member. The tips 42 of the plungers will normally be positioned between tapered extremities of the lock-out slugs. When one plunger is deflected, it will slide between the tapered extremities of adjacent lock-out slugs separating the same and displacing them toward the stop members such that adjacent lock-out slugs will have their raised portions underneath the tip extremities 42 of adjacent plungers. This will prevent full deflection of any additional plunger once one has been deflected. The end lock-out slug may extend out of the frame, as shown in phantom in FIGURE 2 at 77, and operate an auxiliary switch structure, indicated at 79, to provide an auxiliary switch operation independent of the main switching, to be hereinafter defined, for the purpose of providing an indication of deflection of any one of the plungers. Such a switching operation is known as key motion sensing and the contact structure, such as 79, is generally identified as a KMS contact.

With the deflection of any plunger 25, the lock-out slugs will be displaced positioning the raised portions underneath the plunger extremities to prevent deflection of the same. As long as a particular plunger remains deflected, no other plungers may be deflected and are effectively locked out. However, the particular plunger deflected and held in a latched position may be released from the latched position by deflection of any of the other plungers. Sufficient clearance between the ends of adjacent plungers and the raised portions 74 of the lock-out slugs is provided which enables the partial deflection of any of the adjacent plungers thereby releasing the latch on the deflected plunger and allowing it to return under the influence of its associated spring and permitting deflection of any of the adjacent plungers by releasing of a lock-out function.

The improved encoding switch provides a simplified switch structure in the conversion of digital commands to a coded output such as binary switching. The schematic circuit, or switch diagrams 7 and 8, show the relationship between prior art switching configurations for binary code and that of the improved encoding switch of the present invention. In the conversion from digital to binary members with a binary encoding switch, the output switching normally includes conductors representative of the binary code which would be connected into some associated apparatus designed to receive the binary input signal. This would be a switching signal on a number of conductors representative of the binary code. The switching configuration, shown in FIGURE 7, indicates, for example, code or bit conductors 1, 2, 4 and 8 representing the output conductors from the binary switch with a common conductor to complete the circuit. The digital input positions are shown by the digits 1 through 8 and it will be indicated that for various switch positions a plurality of switch contacts are required. In the improved encoding switch of the present invention for binary code, as indicated in FIGURE 8, only 4 switch contacts are utilized to provide a complete binary output for any number of digital inputs up through 15. This is accomplished through the use of a plurality of actuator structures or bars 70–73 which represent the binary output and serve as the actuating portion of the switch for operating the four switch contacts 80–83 of the improved binary encoding switch. It will be understood that with increased digital inputs, that is an increase in the number of digital input mechanisms such as plungers, the number of actuating bars and associated switch closure elements or switch contacts will increase in proportion with the digital to binary conversion. For example, an additional bit bar representing the binary number 16 to provide 5 switches would accommodate additional digital inputs up to and including the 31 positions. Thus, each actuator bar has a single switch contact associated therewith and each switch contact is connected to a different binary bit output conductor. It will also be evident that one or more of the output switches may be operated to make up the desired binary output for any given digital input position. The actuating bars are shown in plan view in FIGURE 6 and it will be evident that they have a plurality of notches along their extent, such as is indicated at 85, and certain of the notches have a cam surface thereon, such as is indicated at 86. In the drawing of the bars in FIGURE 6, there is a notch for each switch input position. Depending upon whether a binary switch is to be operated for that particular digital input, the notch may be square or it may have a cam surface, such as 86 thereon which would indicate that the particular switch position would require actuation of an actuator bar.

As will be seen in FIGURE 1, the plurality of actuator bars are mounted on the switch frame through elongated slots 90 in the respective actuator bars and through headed supporting pins 92 attached to the frame plates 12 and 14 to guide the actuator bars on the frame plates. For symmetry purposes, the actuator bars would normally be disposed in balanced relation on either side of the switch frame but they need only to be mounted for independent movement and to be engaged by appropriate pin 95 on a switch plunger 25 for actuation purposes. The exploded or perspective view of FIGURE 3 shows one version of a plunger 25 with the actuator bars disposed on either side of the same and the appropriate pin 95 extending to either side of the plunger such that it will extend through the notches of all of the actuators bars. The notches are of such dimension that in a raised or inactive position of a plunger, the individual actuator bars may be moved relative to the plunger and the actuating pin 95 without engagement. However, upon deflection of a plunger, the pin 95 thereon will be moved into the notches of the respective actuating bars for that particular position. Where the notches are square, as indicated at 85, there will be no engagement with the actuating bar by the pin. However, whenever a cam surface or inclined surface 86 is present in an actuating bar for the particular switch position, the pin 95 will engage the cam surface and move the actuating bar on its pin mounting 92 translationally relative to the frame and each of the switch actuator bars has an appropriate flange or contact engaging surface which engages a flexible switch blade 100 co-operating with a stationary switch blade 102 of the various binary switches 80–83. These blades are mounted on the frame plate through suitable insulating brackets indicated at 105 and secured thereto by means such as riveting indicated at 106.

It will be evident that the notches 85 need not be positioned in the actuating structures for every switch position where a cam actuating surface 86 is not required to make up the respective binary output switching. Similarly, the cam surfaces do not have to be shaped so that the actuator bars will move in the same direction. Further, the switches 80–83 do not necessarily have to be located at the end of the switch frame, but may for convenience be located at any point where they will respond to actuator structure movement. All that is necessary for the digital to binary conversion is that the respective digital switch plungers or stations be capable of contacting and moving the appropriate actuator structure to provide the desired binary switching output.

In FIGURE 9, there is shown a schematic arrangement of the various cam surfaces 86 on the respective actuator bars which are indicated at the lines 70–73 respectively. The digital numbers 1 through 15 represent the various switch plungers and the marks 86 on the lines represent the cam surfaces to indicate that for this particular position a cam surface exists in the notch and will cause actuation of the bar by deflection of the plunger associated with this switch position. It will be noted that for 4 binary encoding switches, 15 digital input positions or plungers may be utilized and each bar will have eight cam surfaces and the remaining notches will be rectangular such as is indicated at 85. Thus, for example for the digital number 9, the actuating bar 73 and actuating bar 70 will have notches therein with cam surfaces 86 thereon to be engaged by a pin 95 positioned on the plunger 25 for this digital input position. The remaining actuating bars 71, 72 will have square notches therein so that as the plunger is deflected only the bar 70 and 73 will move closing the switches 80 and 83 to make up a binary output of 9 by closure of the switches. It will be readily seen that the number of switch contacts required to provide the binary encoding from the digital input positions is greatly reduced and consequently the associated electrical connections and wiring and soldering to the remaining portion of the circuit is simplified. In addition, with the reduction of the number of contacts employed in the binary encoding switch, the problems of switch failure is greatly decreased and the structure of the switch is simplified.

FIGURE 10 shows an alternate version of an actuating structure for the improved binary encoding switch. Only a single structure is shown and it will be understood that a plurality of structures of this type will be employed to replace the actuating bars 70–73 as are required for the binary switch output. In FIGURE 10, this improved or alternate version of the actuating structure is shown generally at 110 as being comprised of a plurality of segments 120 some of which have cam surfaces 86′ on one edge of the same and some of which have notches 85′ on the edge of the same. In this version of the switch, the individual segments 120 will be separate and movable and the entire structure is supported in a channel-like supporting structure 125 to guide movement of the segments therein. The appropriate actuating pin or pins 95 for the respective switch plungers will be adapted to move into and out of the notches 85′ and in certain of the notches will engage the cam surfaces 86′ thereon to move all of the segments to one side of the same as the plunger is deflected. As shown in FIGURE 10, such movement would be to the right causing the end segment 132 with the appropriate actuating flange 134 thereon to engage and operate the appropriate switch shown at 140 which would be the equivalent of one of the switches 80–83 in the before-mentioned embodiment. In this version of the switch, the individual segments will permit movement of any part of the line of segments depending upon which of the individual segments would be engaged by a pin and whether an actuating or cam surface 86′ would be positioned thereon. It will also be evident that for this version of the switch the individual segments may be combined where a notch 85′ is positioned with the adjacent segment to the left of the same so that the number of individual segments may be reduced and the individual segments 120 with the square notches 85′ therein could be omitted. The spaced parallel side-by-side arrangement of such individual actuating structures 110 suitably mounted on the side of the switch frame and operating switches of the type shown at 140 on the end of the switch frame would produce the digital to binary conversion.

In the operation of the improved binary encoding switch, the digital inputs representing the various switch plungers may be selectively deflected or actuated and with the actuation of any switch plunger by depressing the same, the switch plunger will be latched through operation of the latch bar 60 to cause the pin 61 to ride into the slot 50 and the plunger frame retaining the same in a deflected position. At the same time, the tip of the plunger will displace the lock-out slugs 75 beneath the switch plungers so that the remaining lock-out slug will have a raised portion 74 positioned below the tip 42 of the remaining switch plungers. Thus, until this particular switch plunger is released, no additional plungers may be actuated completely. A minor deflection of any of the remaining plungers will release the latch by engaging of an appropriate pin 61 on the latch bar 60 to displace the same causing the pin in the previously actuated plunger to release from the notch 50 and allow the plunger to return to its released or rest position. With actuation of any plunger representing a digital input number, one or more of the actuating bars 70–73 or structures 110 will be engaged through engagement of the pin 95 on the respective plunger engaging a cam surface in the notch for this switch position. This will cause actuation of one or more of the switches 80–83 or 140 through engagement of the respective actuator structures or bars with the movable contact portion 100 of the same closing this switch contacts. The requisite number of binary contacts will be operated from the respective plunger representing a digital input through engagement of the pin or pins 95 with the cam surfaces for the particular switch position. At the same time, the lock-out slugs may be displaced so that the end slugs 77 of the same would operate the key motion sensing or KMS contact 79 on the end of the switch bank if desired. The actuating bars or rods may take varying forms. For example, they may be broken into a plurality of segments and guided by a single channel similar to the lock-out slugs 75 with appropriate segments having surfaces thereon which would be engaged and displaced to displace all remaining segments in a particular direction to operate the binary switch. It will be recognized that the actual placement of the switch contacts, either in ganged relationship or at the end of the switch frame or displaced above the switch frame with suitable operating pins connecting the respective contacts associated with each actuating bar, may be utilized. Similarly, the actuating bars need not move in the same direction since the cam surfaces may be oppositely inclined between respective bars to facilitate displacement of certain of the switch contacts on the switch frame. It will also be recognized that for certain switch positions where there are no actuating cam surfaces in the actuating bars for predetermined switch position that the pin for such a location may be removed and the actual notch itself removed since it performs no function.

What is claimed is:

1. An encoding switch comprising a frame and a plurality of push rods mounted in said frame and projecting above the same being aligned with the longitudinal extent of said frame to provide digital inputs thereto, said plurality of push rods mounted for reciprocating movement into and out of said frame and being biased in a position out of said frame, a plurality of longitudinally elongated actuator rods journaled for reciprocating motion along the extent of said frame and being located within said frame and disposed in a side-by-side spaced parallel relationship normal to the extent of the push rods and disposed to one side of and adjacent the same, each of said actuator rods having a plurality of characterized notches exposed along the extent of the same and normally aligned with the plurality of push rods, a single switch contact structure mounted on one extremity of said frame for each of said actuator rods adapted to be operated by reciprocating movement of the actuating rods, and a single actuating arm means positioned on and integral with each of said push rods in co-operative and aligned relationship with the characterized notches of each of said elongated actuator rods to reciprocate certain of said actuator rods with the reciprocation of one of the push rods in accord with the characterization of the notch therein to actuate selectively certain of single switch contacts on said frame associated with the actuator rods.

2. The encoding switch of claim 1 in which the single switch contact structure associated with each of the elongated actuator rods represent respectively binary outputs and the characterization of the notches exposed adjacent a single push rod will correspond with a digital to binary conversion with the respective push rod.

3. The encoding switch of claim 1 in which the plurality of the longitudinally positioned, elongated, actuator rods are separately journaled in the frame for independent sliding longitudinal movement between predetermined positions and normal to the extent and movement of the push rods.

4. The encoding switch of claim 3 and including means extending through apertures in the plurality of actuating rods for journaling the same and including biasing means connected between said frame and said rods separately to bias said actuating rods to a predetermined position.

5. The encoding switch of claim 4 in which each single switch contact structure is disposed on said frame adjacent one of said actuating rods to be operated thereby as the rod is moved from one of said predetermined positions to the other of said predetermined positions.

6. The encoding switch of claim 1 and including means slidably mounted in the frame beneath the extremities of the push rods and engagable thereby to prevent more than one push rod from being operated at any one time.

7. The encoding switch of claim 1 and including notches in each of said push rods and co-operative spring-biased detent means positioned in the frame adjacent said push rods to lock a respective push rod when depressed in an operated position and to release the same on operation of any of the other push rods.

8. The encoding switch of claim 1 in which each of said actuator rods have the same number of characterized notches therein as the number of push rods in the switch and in which some of said notches have inclined cam surfaces thereon to move the respective actuator rods when engaged by the push rods between operative positions.

9. The encoding switch of claim 1 in which the single arm means positioned on each of the push rods are rods which extend transverse thereto and fit into the aligned notches for each actuator rod with certain of said notches having cam surfaces thereon such that said cam surfaces are engaged by the rods on said push rods to move the actuator rods between operative positions, and in which the number of push rods represent decimal integers and the single switch contact structure associated with each actuator rod represents a binary integer with the notches on the respective actuator rods for each push rod position being characterized with cam surfaces to operate a single switch contact structure associated with such actuator rods in accord with a binary integer corresponding to the particular decimal integer with a push rod actuated.

10. A multiple-contact encoding switch comprising, a frame, a plurality of actuator structures mounted in said frame, means mounting each of said actuator structures for independent movement between operative position, a plurality of switches positioned on the frame and adapted to be operated respectively by one of said plurality of actuator structures, each of said plurality of switches being associated with a single actuator structure representative of a binary integer, each of said actuator structures having a plurality of notches therein representative of decimal integers with certain of said notches having camming surfaces thereon adapted to be engaged to move the respective actuator structures and operate the associated switch for said particular decimal integer corresponding to said notch, means mounted on the frame for movement to predetermined positions which would represent different consecutive decimal integers, a single arm means integral with said last-named means for each predetermined position positioned in co-operative relationship with the notches for each of said respective consecutive decimal integers to engage camming surfaces on the actuator structures where they exist for said notches when said means is moved to a predetermined position to move said respective actuator structures and operate the associated switch of the binary integer corresponding to the decimal integer.

11. The encoding switch of claim 10 in which said plurality of actuator structures are rodlike members journaled in a parallel side-by-side relationship in said frame.

12. The encoding switch of claim 11 in which the single arm means is an elongated rodlike cam engaging structure mounted on the means mounted in the frame which extends through the notches in said rodlike members for each predetermined decimal integer.

13. The encoding switch of claim 12 in which the means mounted on the frame and adapted to be moved to predetermined positions will remain in said predetermined positions after movement until it is subsequently re-operated and said plurality of switches so operated will remain closed for said predetermined positions.

14. The encoding switch of claim 13 in which the means adapted to be moved to predetermined positions are a plurality of pushbuttons.

15. The encoding switch of claim 10 in which the plurality of actuator structures are a plurality of segments disposed in an adjacent contacting relation with notches in the upper surface of the same and with some of said notches having cam surfaces to be engaged by last-named means to move segments and operate associated switches.

16. The encoding switch of claim 13 and including spring-biasing means for each of said actuator structures included in the associated switches to bias said actuator structures to one of said operative positions and permitting movement of the actuator structures to the other of said operating positions to operate the associated switches through engagement of the cam engaging structure with the camming surfaces in the notches in the respective actuator structures.

References Cited

UNITED STATES PATENTS

| | | |
|---|---|---|
| 2,431,904 | 12/1947 | Andrews. |
| 2,934,613 | 4/1960 | Stoner et al. |
| 3,207,859 | 9/1965 | Tancred. |
| 3,192,327 | 6/1965 | Holzer. |
| 3,227,819 | 1/1966 | Winther. |
| 3,293,362 | 12/1966 | Veldkamp. |
| 3,355,558 | 11/1967 | Geese et al. |

ROBERT K. SCHAEFER, Primary Examiner

M. GINSBURG, Assistant Examiner